United States Patent
Upson et al.

(10) Patent No.: US 8,533,815 B1
(45) Date of Patent: Sep. 10, 2013

(54) FALSE REJECT MITIGATION USING NON-BIOMETRIC AUTHENTICATION

(75) Inventors: Mark Blaine Upson, Mercer Island, WA (US); Peter Henry Horadan, Redmond, WA (US); Yvonne J. Stark, North Bend, WA (US); Mechthild R. Kellas-Dicks, Coquitlam (CA)

(73) Assignee: Scout Analytics, Inc., Issaquah, WA (US)

( * ) Notice: Subject to any disclaimer, the term of this patent is extended or adjusted under 35 U.S.C. 154(b) by 1252 days.

(21) Appl. No.: 12/365,102

(22) Filed: Feb. 3, 2009

(51) Int. Cl.
*H04L 9/23* (2006.01)

(52) U.S. Cl.
USPC ............................... 726/19; 726/7; 713/168

(58) Field of Classification Search
USPC .......................................................... 726/19
See application file for complete search history.

(56) References Cited

U.S. PATENT DOCUMENTS

| | | | |
|---|---|---|---|
| 4,805,222 A * | 2/1989 | Young et al. ................. | 382/115 |
| 5,557,686 A * | 9/1996 | Brown et al. ................ | 382/115 |
| 7,003,670 B2 * | 2/2006 | Heaven et al. ............... | 713/186 |
| 7,509,686 B2 * | 3/2009 | Checco ......................... | 726/27 |
| 7,571,326 B2 * | 8/2009 | Chen ........................... | 713/186 |
| 7,620,819 B2 * | 11/2009 | Phoha et al. .................. | 713/186 |
| 7,706,574 B1 * | 4/2010 | Ross ............................. | 382/115 |
| 7,874,011 B2 * | 1/2011 | Boss et al. ..................... | 726/28 |
| 7,930,285 B2 * | 4/2011 | Abraham et al. ............ | 707/706 |
| 8,020,005 B2 * | 9/2011 | Mani et al. ................... | 713/182 |
| 2007/0130463 A1 * | 6/2007 | Law et al. .................... | 713/168 |
| 2007/0245151 A1 * | 10/2007 | Phoha et al. .................. | 713/186 |
| 2008/0134317 A1 * | 6/2008 | Boss et al. ..................... | 726/18 |
| 2009/0100270 A1 * | 4/2009 | Ting ............................. | 713/186 |
| 2009/0150992 A1 * | 6/2009 | Kellas-Dicks et al. ......... | 726/19 |
| 2010/0162386 A1 * | 6/2010 | Li et al. ......................... | 726/19 |
| 2010/0328033 A1 * | 12/2010 | Kamei .......................... | 340/5.82 |

* cited by examiner

*Primary Examiner* — Kambiz Zand
*Assistant Examiner* — Yonas Bayou
(74) *Attorney, Agent, or Firm* — Blakely Sokoloff Taylor & Zafman LLP

(57) ABSTRACT

Providing secondary non-biometric authentication to identify a user following a failure of a biometric authentication based on a biometric template. In one embodiment, a knowledge-based authentication scheme may be provided. In another embodiment, a one-time password authentication scheme may be provided. An identity of the user may be confirmed using the non-biometric based authentication scheme.

14 Claims, 6 Drawing Sheets

FALSE REJECT MITIGATION USING NON-BIOMETRIC AUTHENTICATION

FIELD

Keystroke dynamics authentication.

BACKGROUND

Authentication systems protect resources, such as documents and data, and accurately identify the creator of the resource. For example, a message (i.e., a written instrument or electronic document) created by an individual can be marked by a hand written signature, sealed by a physical seal, or protected by a password or a personal identification number (PIN) in order to identify the author of the message or control access to its contents. In some electronic or computer systems, the signature, PIN or password of the message creator is stored in a central memory or in storage media that is part of the computer system. When a user desires to read the protected message, the user enters the appropriate signature, password or PIN using an input device. The computer system compares the signature, password or PIN that is entered using the input device with the stored signature, password or PIN associated with the message to be accessed and determines whether to allow the message to be displayed or accessed.

Computer systems often contain valuable and/or sensitive information, control access to such information, or play an integral role in securing physical locations and assets. The security of information, assets and locations is only as good as the weakest link in the security chain, so it is important that computers reliably be able to distinguish authorized personnel from impostors. In the past, computer security has largely depended on secret passwords. Unfortunately, users often choose passwords that are easy to guess or that are simple enough to determine via exhaustive search or other means. When passwords of greater complexity are assigned, users may find them hard to remember, so may write them down, thus creating a new, different security vulnerability.

Various approaches have been tried to improve the security of computer systems including authentication systems that rely on unique physical characteristics of users to identify authorized users. For example, fingerprints, voice patterns and retinal images have all been used with some success. However, these systems usually require special hardware to implement (e.g. fingerprint or retinal cameras; audio input facilities). Therefore, there is a need for an authentication process that uses unique physical characteristics of users without requiring special hardware.

SUMMARY OF THE DESCRIPTION

Embodiments may deny access to a resource based on biometric authentication using a keystroke dynamics template. A message may be transmitted to the user in response to the denied access. A response message may be received for determining the identity of the user.

BRIEF DESCRIPTION OF THE DRAWINGS

The present invention is illustrated by way of example and not limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
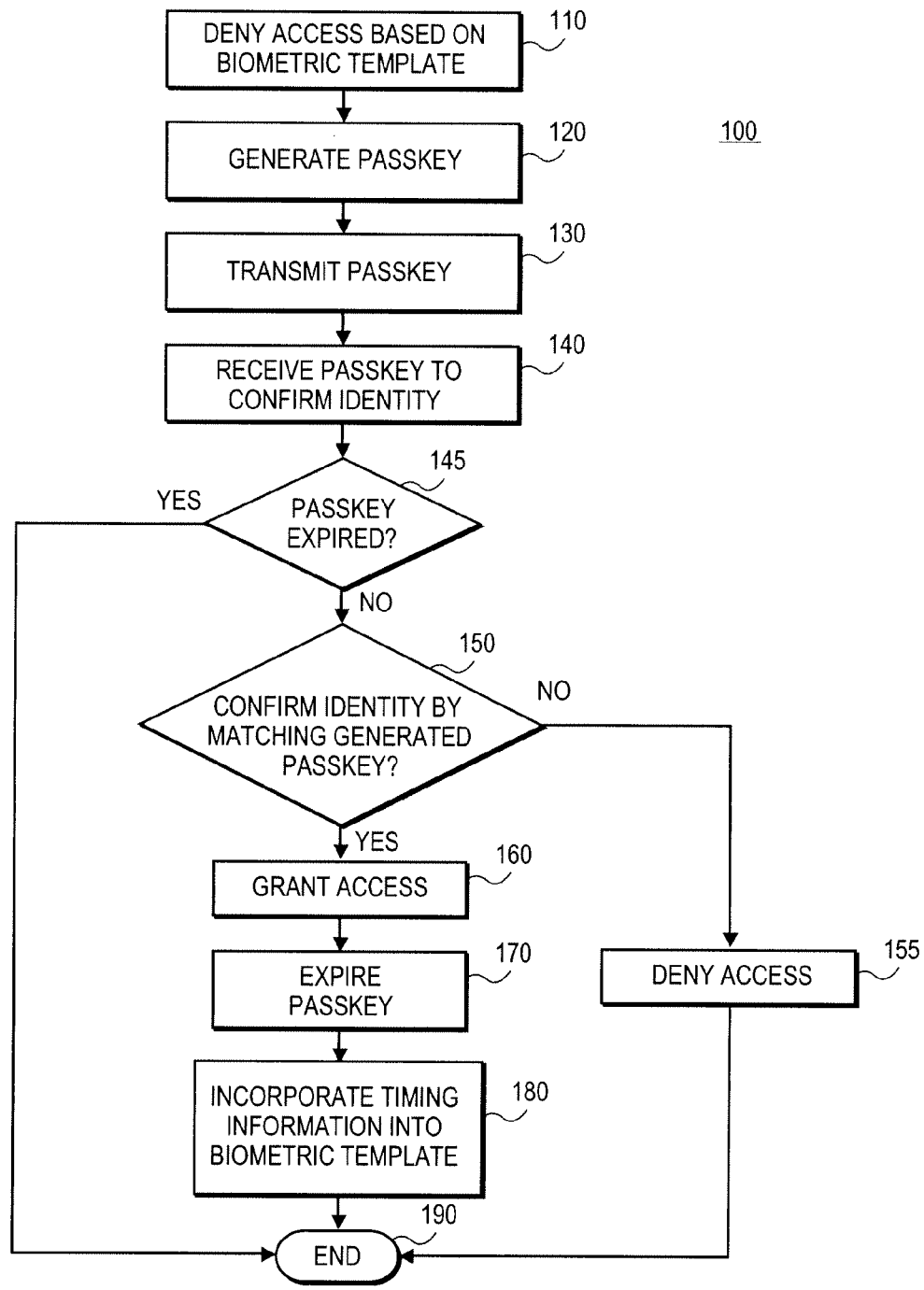
FIG. 1 is a diagram illustrating one embodiment of a process for authenticating using a one-time password after failing authentication based on a biometric template.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. It will be apparent to one of ordinary skill in the art that the embodiments may be practiced without some of these specific details. In other instances, certain structures and devices are omitted or simplified to avoid obscuring the details of the various embodiments.

Biometric authentication may authorize users to access a resource such as a document or device based on the user input patterns. For example, the user input pattern may include timing information of key-press and key-release events detected during entry of a phrase in which the user inputs a password or other phrases. The user may use any input device including a keyboard, touch pad, touch screen, mobile device, or PDA to input the phrase. The phrase may include a user name and password. This process may not require complicated physical characteristic recognition systems and provides a cost effective and strong secure authentication process and may not entirely rely on the content of the password or secured information.

A process to implement this authentication process based on user input patterns is to collect user input samples. To create a biometric template for authenticating a user based on physical and behavioral characteristics, user samples may be categorized. A measurement of such physical and behavioral characteristics may be referred to as the biometric measurements. For example, when a user enters a password, the time duration between keystrokes as the user types the password can be construed as a biometric measurement. For the purpose of this application, biometric measurements and raw samples (e.g. raw data sample, input data, etc.) will be used interchangeably.

Because biometric measurements rely on a user's physical and behavioral characteristics rather than the secrecy of a passphrase, the passphrase is no longer required to remain secretive. When a user is authenticated via a biometric security system, the user's physical and behavioral characteristics are measured (e.g., based on the input sample with keystroke timing information) and compared with a predetermined template (e.g., containing keystroke timing information). If there is a match, the user is authenticated. In the process of forming the template, the user may be required to enter multiple samples. By processing through an engine, these multiple samples will be transformed into a biometric template.

Collection of Biometric Data

A biometric template serves as the foundation for authenticating a user. The biometric template is prepared after completing an enrollment process that collects biometric data from the user's input based on key-press and key release event data on a keyboard. In one embodiment, the enrollment process may be implemented as a gradual process in a sense that the user input data is cumulatively collected until a satisfactory amount of collected samples is met to produce a template for the user. For example, a user's input data may be collected in several distinct instances to collect sufficient biometric data that produces a biometric template. In this manner, a user may be authenticated by using the template in comparison with future user input data. For example, a user may type in a ID and pass phrase on a keyboard as part of an authentication process. Data including timing information based on the user's typing rhythm may then be extracted and compared against the template corresponding to the user. The user's typing rhythm may be based on timing information measuring key dwell times and key flight times. If the data related to the user's typing rhythm is found to be a suitably similar to the data found in the template, the user may then be successfully authenticated.

However, there are instances when the user may be falsely rejected because of an unreliable template or extraneous conditions that impact the input data. For example, extraneous conditions that could derail a positive authentication of the user may include situations where the user is experiencing a high level of stress. A user under an abnormal degree of stress could exhibit physiological changes that would modify the user's typical rhythm under normal circumstances. The user may also be recovering from a physical injury or afflicted with a physical disability that would drastically change the user's typing rhythm. Further, differences in keyboard devices may introduce timing delays that contribute to an authentication error. In these instances, it may be desirable to provide a secondary authentication scheme to identify the user. Therefore, a process is needed to account for such occurrences of falsely rejecting the user so that the user may be authenticated after a biometric based authentication failure.

Using Non-Biometric Based Authentication after a Failure of Biometric Authentication FIG. 1 illustrates one embodiment of a process 100 for authenticating using a one-time password after failing authentication based on a biometric template. The biometric template is prepared after or upon completing an enrollment process that collects biometric data from the user's input based on key-press and key release event data of a phrase entered by the user on a keyboard. For example, a user may type in and a computer system may receive (e.g., collect) numerous samples (e.g., attempts to type all the characters of the phrase) of a phrase such as a user ID and/or a pass phrase (e.g., a "password") on a keyboard as part of an enrollment process. A biometric template is then created having vectors for various features of the phrase statistically calculated based on the collected keystroke timing data of the samples. The template may be used to identify the user's biometric measurements or typing style for the typed phrase. The template may represent or identify the user's typing rhythm based on timing data measuring features for some or all of the samples of the phrase.

In block 110, access to a resource is denied based on a biometric template. In one embodiment, the biometric template comprises a keystroke dynamics template ("template") from data including previously measured key-press and key-release times. Timing information of key-press and key-release events detected during keyboard (or similar input device) entry of a phrase is compared with the data in the keystroke dynamics template to determine the identity of the user. In one embodiment, the phrase may comprise a user ID and password. If the timing information of key-press and key-release events (in comparison with the biometric template) fails to meet a predetermined threshold value, then access is denied based on the biometric template. In one embodiment, access is denied to a resource that may include, but is not limited to, data, documents, E-mail, an operating system, or a computer system that requires authentication before granting access.

In block 120, a passkey is generated. In some cases, a non-bio authentication process or system may include a one-time password (e.g., a mechanism or process) for authentication which relies upon a constantly varying passkey which, once used, is expired and cannot be re-used for authentication. Also, a one-time passkey may expire after a certain amount of time, e.g. a few minutes, regardless of whether or not the passkey is used. The passkey (or password) may be generated as follows. A mathematical process or algorithm is initialized with a secret (e.g., to the general public, or user) seed value. When a new passkey is needed, a second input (e.g. the previous passkey or the current time) is passed into the mathematical process or algorithm and combined with the secret seed to generate a new passkey.

In block 130, the passkey is transmitted. The mode of communicating the passkey to the legitimate user (e.g., sending so that the user can receive the passkey) can be through the distribution of a physical device (e.g., a token, such as a computer device containing the mathematical algorithm, the secret seed, and synchronized with the current time) that can generate the passkey. Another way of communicating the passkey is to download (e.g., by the user) software containing the mathematical algorithm and the secret seed to a wireless or wired communication and/or computer device (e.g., the user's cell phone), thus enabling the device (cell phone) to generate the passkey. Another way is to send the passkey directly to a wireless or wired physical device known to be in the possession of the user (e.g. sending a text message to a user's cell phone).

In block 140, a passkey is received and will be used to confirm the identity of the user. In block 145, it is determined whether the passkey is expired. If the passkey is expired then the process ends at block 190. If the passkey has not expired, at block 150 the received passkey is compared with the previously generated passkey to determine whether the respective passkeys match. A non-matching passkey results in a denial of access at block 155 and the process then ends at block 190. A match between the passkeys indicates that the user has the same identity as purported in the received passkey. At block 160, access is granted to the resource. At block 170, the passkey is then expired. Expiring the passkey improves security by preventing an imposter from using the same passkey in an attempt to gain access to the resource.

In one embodiment, at block 180, timing information from collected user input samples may be incorporated into the keystroke dynamics template. Timing information from user input samples are collected during the entry of a phrase into a keyboard or other input device. As discussed above, the collected samples from the user were used to authenticate the user based on the biometric template. The collected timing information of key-press and key-release events are incorporated into the keystroke dynamics template following a successful authentication using the non-biometric one-time password. In this instance, the denial of access based on the biometric template at block 110 may be considered a type of statistical error called the False Reject Rate ("FRR"). FRR represents the occurrence of rejecting a user as an imposter when the user is a real user. In one embodiment, incorporating the timing information may be accomplished by adding values representing scalar quantities of the timing information to the vectors within the template. In this manner, errors associated with falsely rejecting the user are reduced during the authentication process and the template may be improved for future authentication of the user and FRR for the user may be reduced. Finally, at block 190, the process may end.

Figure 2:
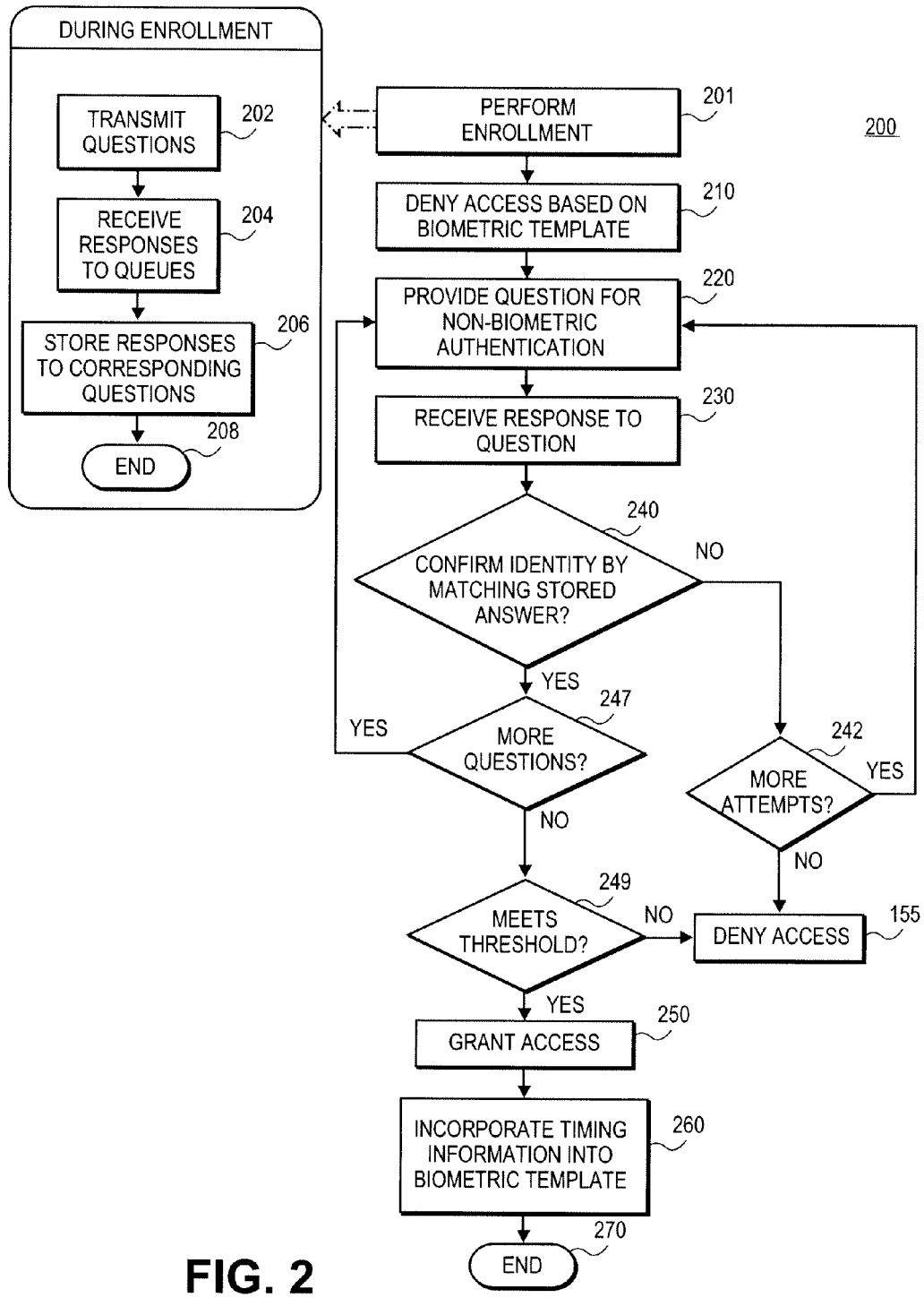
FIG. 2 is a diagram illustrating one embodiment of a process for authentication using knowledge-based authentication after failing authentication based on a biometric template.

FIG. 2 is a diagram illustrating one embodiment of a process 200 for authentication using knowledge-based authentication after failing authentication based on a biometric template. In some cases, a non-biometric authentication process or system may include a knowledge-based authentication that is a mechanism (e.g., implemented using a wireless or wired communication and/or computer device) for authenticating based upon personal knowledge of a user. Typically this type of authentication is performed as follows. During enrollment (e.g., part of block 201), a user may be asked to select a number of questions that are transmitted at block 202 from a pre-defined list and provide an answer (usually personal in nature and not known or easily discoverable by people who are not familiar with the user) to each. For example, these questions may comprise questions such as the location of the user's elementary school, the user's birth city, the user's mother's maiden name, the make and model of the user's first car, or the user's favorite high school teacher. At block 204, the responses to these questions are received. At block 206, these answers are stored to corresponding questions for identifying the user in a future authentication. At block 208, the process of collecting answers for the knowledge-based authentication may end.

At block 210, access to a resource is denied based on a biometric template. In one embodiment, the biometric template comprises a keystroke dynamics template ("template") from data including previously measured key-press and key-release times as described above in FIG. 1. If the timing information of key-press and key-release events (in comparison with the biometric template) fails to meet a predetermined threshold value, then access is denied based on the biometric template. In one embodiment, access is denied to a resource that may include, but is not limited to, data, documents, E-mail, an operating system, or a computer system that requires authentication before granting access. Since the authentication based on the biometric template has failed, in some instances a secondary non-biometric authentication scheme is provided. In this manner, the user may gain access to the resource using the non-biometric based authentication scheme.

At block 220, questions are provided for a non-biometric authentication. For example, a question from a subset of questions that were answered during enrollment is selected and provided to the user as part of a non-biometric authentication. In one embodiment, the user must answer a certain number of such questions correctly for the authentication to be complete. Typically the questions are provided and supplied in a textual fashion, such as using a wireless or wired communication and/or computer device. The user may then input the answers to these questions.

At block 230, a response to the question from the subset of questions may be received. At block 240, an identity of the user is confirmed by matching the responses to answers to corresponding questions that were stored during enrollment (e.g., at block 206). If the response fails to match the stored answer to the corresponding question, then at block 242 a check is made to determine whether the user has more attempts to answer the question correctly. In one embodiment, the number of attempts that the user is allotted may be a predetermined amount. In the event that the number of attempts is exhausted, at block 245 access may be denied and the process ends at block 270. When a match between the response and answer to the corresponding question occurs, at block 247 a check is made to determine whether more questions are required to be answer to complete authentication. If more questions need to be answered then another question is provided at block 220 and the process continues. In one embodiment, the number of questions that the user answered correctly and incorrectly may be accounted for and compared to a predetermined threshold at block 249 to determine whether access to the resource is granted at block 250. Access is denied at block 245 when the number of correct answers for the subset of questions has failed to meet the threshold and the process may end at block 270.

Similar to block 180 described in FIG. 1, timing information from collected user input samples may be incorporated into the keystroke dynamics template at block 260. Timing information from user input samples are collected during the entry of a phrase into a keyboard or other input device. The collected timing information of key-press and key-release events are incorporated into the keystroke dynamics template following a successful authentication using the non-biometric knowledge-based authentication. In this instance, the denial of access based on the biometric template at block 210 may be considered an instance of FRR. In one embodiment, incorporating the timing information may be accomplished by adding values representing scalar quantities of the timing information to the vectors within the template. In this manner, errors associated with falsely rejecting the user are reduced during the authentication process and the template may be improved for future authentication of the user and FRR for the user may be reduced. Finally, at block 270, the process may end.

Figure 3:
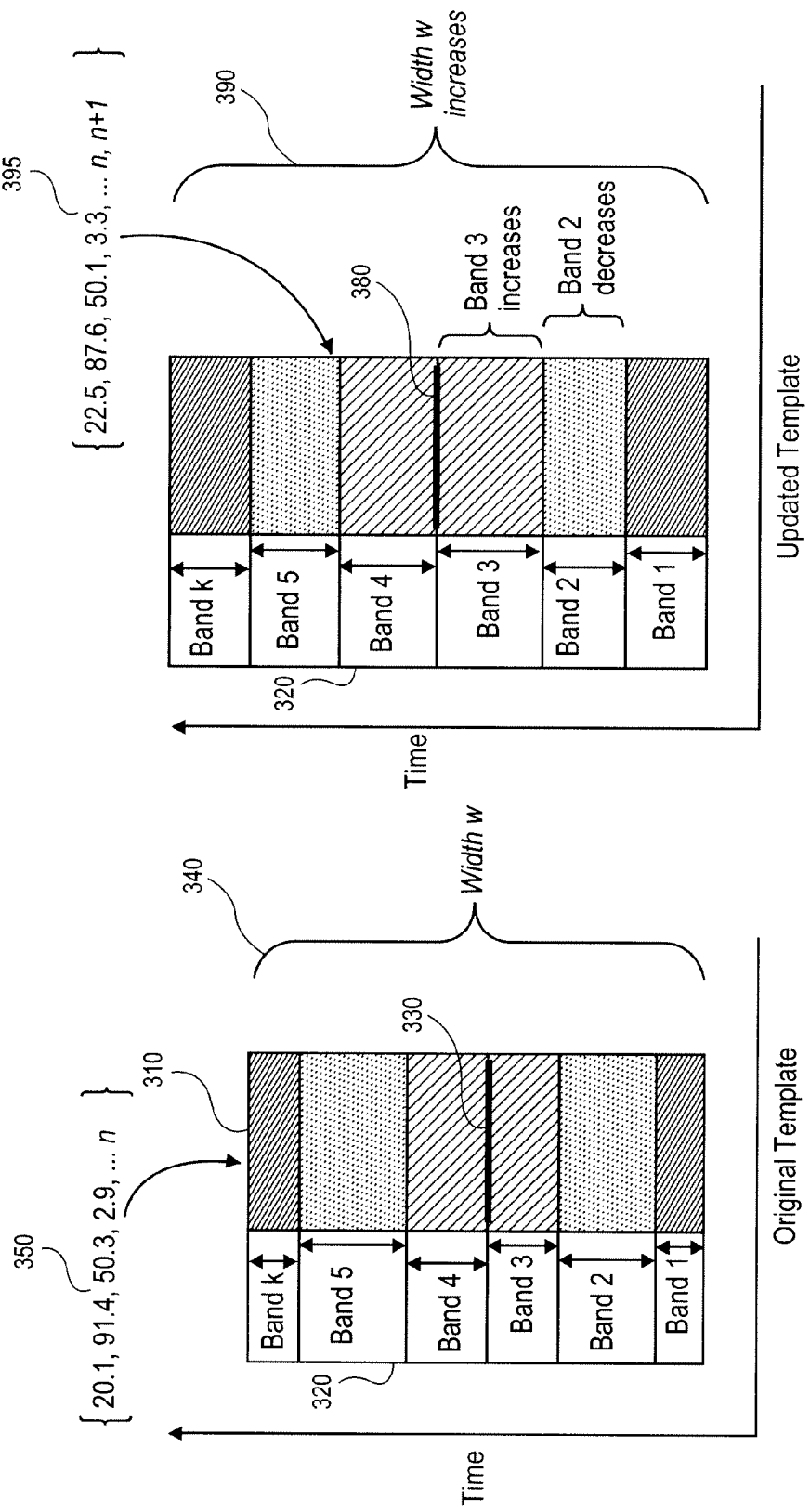
FIG. 3 is a diagram illustrating one embodiment for incorporating collected timing information after a successful non-biometric based authentication into the keystroke dynamics template.

FIG. 3 is an illustration of one embodiment of a process 300 for incorporating collected timing information during authentication of the user into the keystroke dynamics template. The collected timing information may be incorporated following a successful authentication using the secondary non-biometric authentication scheme as described in FIGS. 1 and 2. In the case when the user is successfully authenticated via the secondary authentication scheme, a false rejection of the user has occurred based on the template. A false rejection represents an occurrence of a failed authentication for the user because of inconsistencies in the user's typing rhythm or errors in the template. As an illustration of how a false rejection may occur, during enrollment, the user may be in a controlled environment that promotes the user to provide consistent user input samples. The controlled environment may include the same type of computer system with the same type of keyboard device. However, the user may be falsely rejected based user input samples of key timing information because of changes to this controlled environment that the template was based on. For example, the user may be at a remote location using a separate computer system than the one that was used during enrollment. This separate computer system may include a different type of keyboard device (e.g., wireless, BLUETOOTH, laptop, laptop in a docking station, or desktop) and may be located in the remote location away from the computer system containing the resource to be accessed. In other instances, the user may be using the identical computer system used during enrollment, but other factors contribute to the user being falsely rejected. These other factors include physiological changes (e.g., the user's nervous system may be impaired in some fashion or in an abnormal state) that introduce variations into the keystroke timing information collected from the user input. In another scenario, the user may have acquired a recent physical condition (e.g., a disability) that changes the user's input rhythm to the input device. Therefore, it is desirable to incorporate collected timings including the key timing information of the user into the template to account for the factors denoted above.

In one embodiment, the data in a template 310 may be divided into a set of bands 320, wherein each band includes a respective range of values related to the data in the template. A vector 350 may include n amount of scalar quantities in the template, where n represents the number of previous user input samples used to create the template. Following a successful authentication of the user using the secondary non-biometric authentication scheme as described above in FIGS. 1 and 2, an additional value shown as n+1 may be incorporated into vector 350 to produce vector 395. In this manner, template 310 may be updated. This additional value may represent a scalar quantity based on the collected timing information of the user input samples during the current session. Although, in this example, an additional value n+1 is incorporated into vector 350 to produce vector 395, it should be understood that more values from the collected user input samples may be incorporated into the vectors of the template. Template 360 represents the updated template after incorporating the additional value or values. After the additional value or values are incorporated into the template, a center 380 in the template 360 may represent a mean of the values in vector 395. In this example, center 380 has shifted up when compared with center 330 in template 310. Although in this example center 380 has shifted up, the updated template can widen, stay the same or shrink depending on the sample (i.e., n+1) now incorporated into vector 395. A width 390 of template 360 may represent a total range of values with the additional values now incorporated in the template. In this example, width 390 of template 360 has increased in comparison with width 340 of template 310. Also shown in FIG. 3, after the template has been updated, band 3 of template 360 has increased when compared to band 3 of template 310. Moreover, band 2 of template 360 has decreased in comparison with band 2 of template 310. Again, the changes in bands 370 illustrated in FIG. 3 are representative in nature and template 360 may widen, stay the same or shrink depending on the additional values now incorporated into vector 395. Incorporating collected timings results in a modification of these vectors in the template and may then be used for subsequent authentication of the user. In this manner, the quality of template may be improved to include key timing information in instances where the user is attempting to access the resource using a different environment (e.g., different keyboard) or different physiological condition (e.g., disability) than the one during the enrollment process. Consequently, the instances of false rejections may be reduced for the user.

After updating the template, the input samples in the template now include enrollment samples and authentication samples that are part of a successful authentication attempt using a secondary non-biometric authentication scheme. Because a user's typing rhythm is an evolving one, weighting the most recently submitted samples more than the older samples allows the template to be more adaptive to that evolving rhythm. In one embodiment, the weighting mechanism is constructed as follows. Each sample $S_i$ is assigned a weight that reflects a time $W_i$ that it was submitted. Since the more recent samples are favored, this means that $W_2 > W_1$ if $S_1$ is submitted prior to $S_2$.

The template may then be created and be updated using a weighted average/mean for a center C and weighted standard deviation for a variability V. Since $S_i$, C and V are all vectors, the equations may be written in a point-wise manner:

$$C_j = \frac{\sum_i \{S_{i,j} * W_i\}}{\sum_i W_i} \quad (EQ1)$$

$$V_j = \sqrt{\frac{\sum_i \{W_i * (S_{i,j} - C_j)^2\} * \sum_i W_i}{\{\sum_i W_i\}^2 - \sum_i \{W_i\}^2}} \quad (EQ2)$$

where in equations EQ1 and EQ2, $S_{i,j}$ is the $i^{th}$ point in the $i^{th}$ Sample vector, $W_j$ is the weight associated with the $i^{th}$ Sample, $C_j$ is the $i^{th}$ point of the Template Center vector, and $V_j$ is the $j^{th}$ point of the Template Variability vector.

Figure 4:
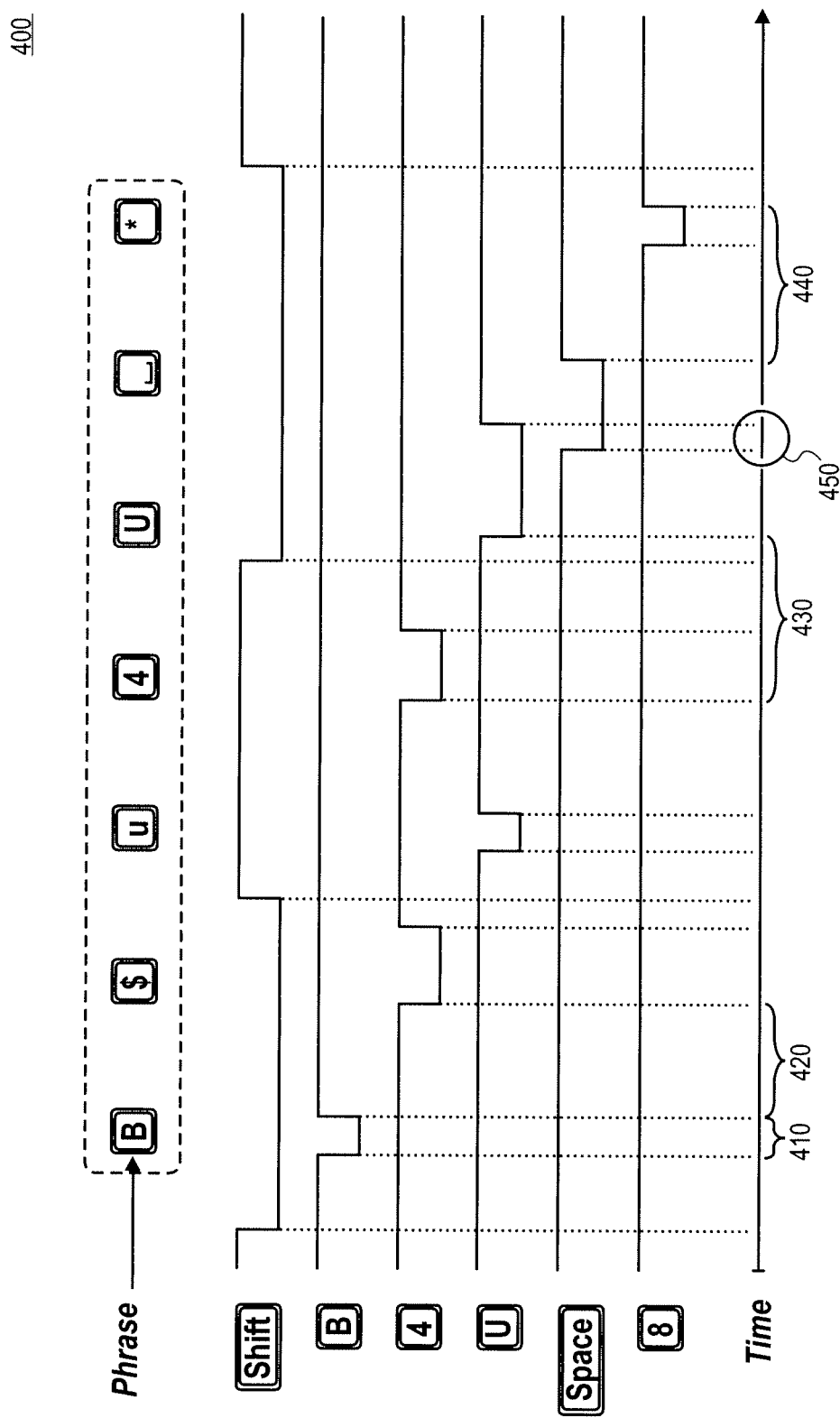
FIG. 4 is a diagram illustrating timing information collected from the keyboard activity of a user.

FIG. 4 is an illustration of timing information 400 collected from the keyboard activity of a user. A graphical depiction of possible time periods for a phrase and the corresponding keyboard activity that may occur during typing of the phrase is shown. One simple, useful datum that can be computed from the raw keystroke timing data is the length of time a key is depressed 410, the "dwell time." Another useful measure is the time from the release of one key to the depression of the next 420, called the "flight time." Dwell and flight times can efficiently represent all of the key events that occur during the typing of a phrase. Note that flight time may be negative, as shown at 450: the 'U' key was not released until after the "Space" key was pressed, so the "U*Space" flight time is negative.

Other derived measures could also be used by an embodiment. For example, the key-press-to-subsequent-key-press time 430, or key-release-to-subsequent-key-release time 440 also permit the events that occurred during the typing of the phrase to be represented in a useful way. Some embodiments may compute key press and release times relative to the key press event that starts the entry of the phrase, or the key press (or release) event that ends entry of the phrase.

In one embodiment, data related to dwell times, flight times, and other derived measures as shown in FIG. 4 may be incorporated into the template to improve quality of the template after a denial of access to a resource.

Figure 5:
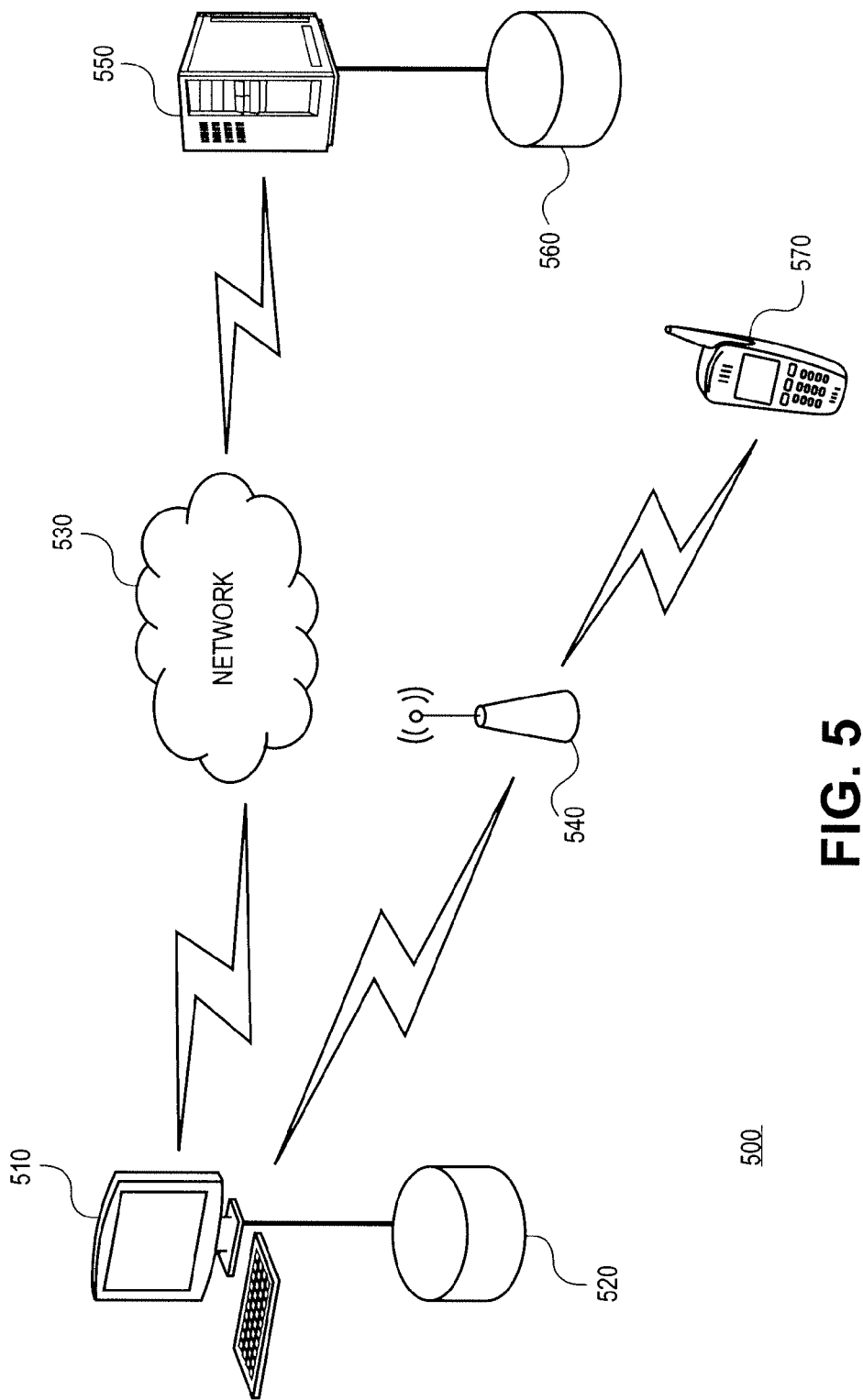
FIG. 5 is a diagram illustrating a system for authenticating a user based on a biometric template.

FIG. 5 is an illustration of a system 500 that may implement the embodiments described in FIGS. 1-3 for authenticating a user based on a non-biometric based authentication (after failing a biometric based authentication using a biometric template). A user may be authenticated using a keyboard device on computer system 510. Although the user may use a keyboard device in this embodiment, in an alternate embodiment any suitable input device including a touch pad, touch screen, or tablet PC may be used. Computer system 510 may also include a processor for executing operations related to the authentication process, a communication device for interfacing with server 550 over network 530 and wireless device 570 over wireless access point 540, and storage device 520 that contains the executable instructions that comprise the authentication process. Storage device 520 may also contain a resource that the user is accessing that requires authentication. In one embodiment, computer system 510 may communicate with wireless device 570 to exchange information related to the authentication process. In one embodiment, server 550 includes a communication device to interface with computer system 510 over network 530. Server 550 may also store a resource on storage device 560 that is accessed by the user with computer system 510.

Figure 6:
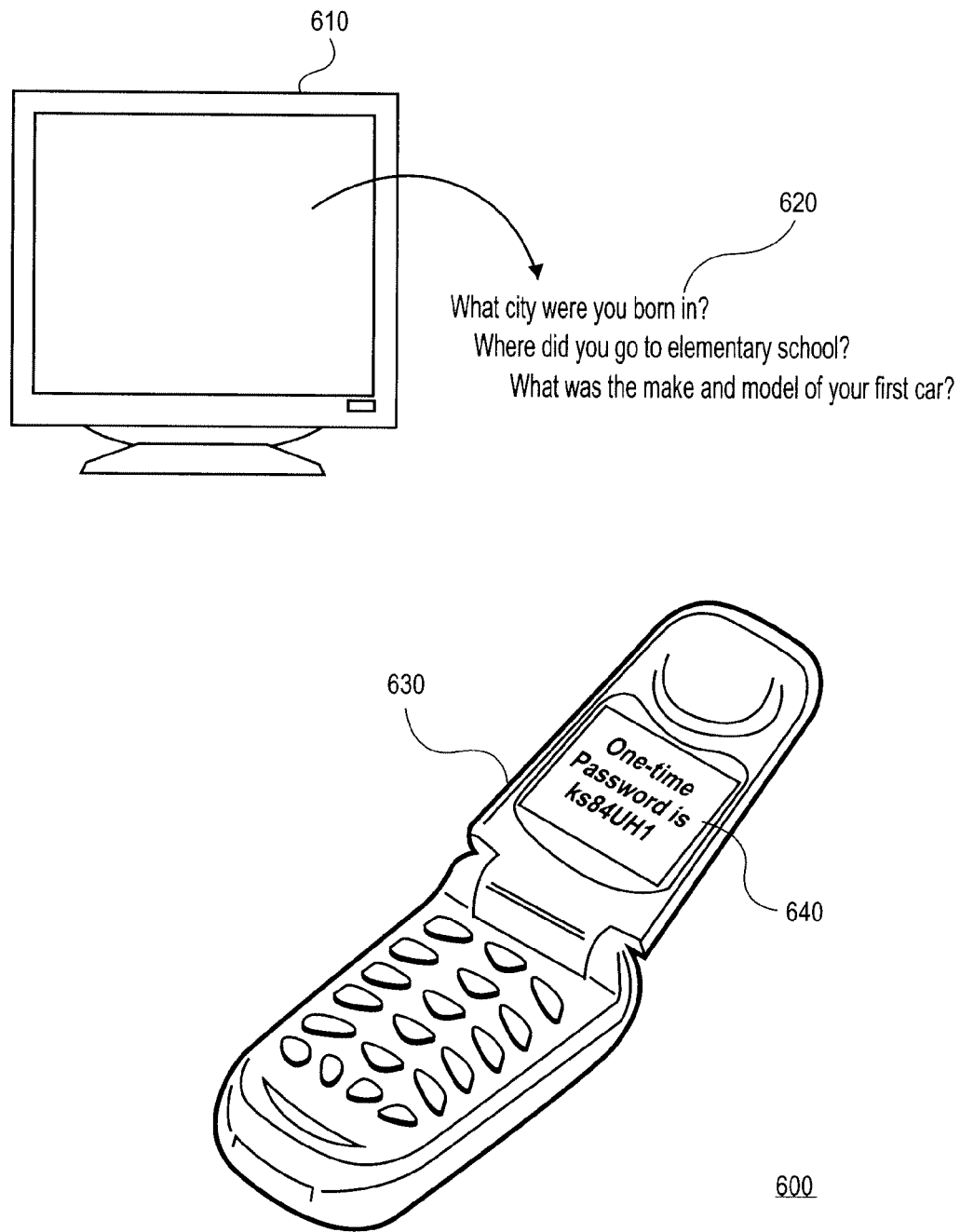
FIG. 6 is diagram illustrating embodiments of secondary non-biometric based authentication.

FIG. 6 is diagram illustrating embodiments 600 of secondary non-biometric based authentication. During a knowledge-based authentication process as described above in FIG. 2, display device 610 may display questions 620 to a user. In one embodiment, questions 620 is displayed in a textual format. The user may then enter responses to questions 620 using a suitable input device, such as a keyboard. Based on the response to questions 620, an identity of the user may be confirmed and access to a resource may be granted.

During a one-time password authentication process as described in FIG. 1, mobile device 630 may display message 640. In one embodiment, message 640 may be sent using a short message service (i.e., SMS message) to mobile device 630. The user may then use the content in message 640 to access the resource by entering in the one-time password. In one embodiment, the user may enter the one-time password using a suitable input device, such as a keyboard.

The processes described herein may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), erasable, programmable read-only memories ("EPROMs"), electrically-erasable read-only memories ("EEPROMs"), Flash memories, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required process steps. The required structure for a variety of these systems will appear from the description below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that improved keystroke dynamic authentication can also be achieved by software and hardware that distribute the functions of embodiments of this invention differently than herein described. Such variations and implementations are understood to be captured according to the following claims.

What is claimed is:

1. A method comprising:
   denying access to a resource upon a failure of a biometric based keystroke timing authentication;
   generating a one-time password to be transmitted to a user;
   transmitting a message including the one-time password to the user in response to denying access;
   receiving a response message for determining an identity of the user;

confirming the identity of the user based on the response message; and granting access to the resource in response to the identity of the user being confirmed, wherein confirming the identity of the user is based on the response message matching the one-time password.

2. The method of claim 1, further comprising:

expiring the one-time password after granting access.

3. The method of claim 1, further comprising:

expiring the one-time password after a predetermined time period; and denying access to the resource in response to receiving the expired one-time password.

4. The method of claim 1, further comprising:

selecting a question to be transmitted in the message to the user;

confirming the identity of the user based on the response message; and granting access to the resource in response to the identity of the user being confirmed.

5. The method of claim 4, wherein the identity of the user is confirmed by determining content in the response message matches a predetermined answer to the question submitted in the message to the user.

6. A method comprising:

transmitting a subset of messages to a user, wherein the subset of messages include a plurality of questions from a predefined list of knowledge-based authentication questions;

receiving responses for the subset of message from the user, wherein the responses are a plurality of different answers to the questions and include information based upon personal knowledge of the user;

storing each received response to correspond with a respective message of the subset of message; and using the subset of messages for a non-biometric based authentication of the user, wherein using the subset of messages for the non-biometric based authentication occurs after a failure of a biometric based authentication of the user.

7. The method of claim 6, wherein transmitting the subset of messages occurs during enrollment of the user.

8. The method of claim 7, wherein enrollment of the user results in a keystroke dynamics template containing timing information of key-press and key-release events.

9. The method of claim 8, wherein the keystroke dynamics template includes data representing key dwell times and key flight times.

10. A non-transitory computer-readable medium storing data and instructions to cause a programmable processor to perform operations comprising:

denying access to a resource upon a failure of a biometric based keystroke timing authentication;

generating a one-time password to be transmitted to a user;

transmitting a message including the one-time password to the user in response to denying access;

receiving a response message for determining an identity of the user;

confirming the identity of the user based on the response message; and granting access to the resource in response to the identity of the user being confirmed, wherein confirming the identity of the user is based on the response message matching the one-time password.

11. The non-transitory computer-readable medium of claim 10, including further operations comprising:

expiring the one-time password after granting access.

12. The non-transitory computer-readable medium claim 10, including further operations comprising:

adding the timing information into a vector containing scalar quantities corresponding to collected timing information of key-press and key-release events.

expiring the one-time password after a predetermined time period; and denying access to the resource in response to receiving the expired one-time password.

13. The non-transitory computer-readable medium of claim 10, including further operations comprising:

selecting a question to be transmitted in the message to the user;

confirming the identity of the user based on the response message; and granting access to the resource in response to the identity of the user being confirmed.

14. The non-transitory computer-readable medium of claim 13, wherein the identity of the user is confirmed by determining content in the response message matches a predetermined answer to the question submitted in the message to the user.

* * * * *

UNITED STATES PATENT AND TRADEMARK OFFICE
CERTIFICATE OF CORRECTION

PATENT NO.        : 8,533,815 B1
APPLICATION NO.   : 12/365102
DATED             : September 10, 2013
INVENTOR(S)       : Mark Blaine Upson et al.

Page 1 of 1

It is certified that error appears in the above-identified patent and that said Letters Patent is hereby corrected as shown below:

In the Claims, Column 12, Claim 12, line 23, please delete "medium claim" and insert
-- medium of claim --.

Signed and Sealed this
Third Day of December, 2013

Margaret A. Focarino
*Commissioner for Patents of the United States Patent and Trademark Office*